United States Patent
Tanaka et al.

(10) Patent No.: US 7,724,314 B2
(45) Date of Patent: May 25, 2010

(54) METHOD FOR REPAIRING A SHORT IN A SUBSTRATE FOR A DISPLAY AND DISPLAY REPAIRED ACCORDING TO THAT METHOD

(75) Inventors: Yoshinori Tanaka, Kawasaki (JP); Kenichi Nagaoka, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 767 days.

(21) Appl. No.: 11/051,763

(22) Filed: Feb. 4, 2005

(65) Prior Publication Data

US 2006/0012729 A1  Jan. 19, 2006

(30) Foreign Application Priority Data

Jul. 16, 2004  (JP) ............... 2004-209800

(51) Int. Cl.
*G02F 1/1343* (2006.01)
(52) U.S. Cl. ............... 349/54; 349/39; 349/40; 349/55; 349/139; 349/141; 349/149; 349/192
(58) Field of Classification Search ........... 349/55, 349/54, 192
See application file for complete search history.

(56) References Cited

U.S. PATENT DOCUMENTS

| 5,002,367 | A | * | 3/1991 | Nicholas | .............. 349/54 |
| 6,333,769 | B1 | | 12/2001 | Suzuki et al. | |
| 2001/0028418 | A1 | | 10/2001 | Ozaki et al. | |
| 2002/0071086 | A1 | * | 6/2002 | Kim et al. | .............. 349/152 |

FOREIGN PATENT DOCUMENTS

| JP | 62-038423 | 2/1987 |
| JP | 11-218782 | 8/1999 |
| JP | 2000-19556 | 1/2000 |
| JP | 2002-182246 | 6/2002 |
| JP | 2003-43507 | 2/2003 |
| JP | 2003-156763 | 5/2003 |

OTHER PUBLICATIONS

Machine translation of JP 2003-156763.*

* cited by examiner

*Primary Examiner*—Andrew Schechter
(74) *Attorney, Agent, or Firm*—Greer, Burns & Crain, Ltd.

(57) ABSTRACT

The invention provides a substrate for a display which can be easily repaired even when there are problems such as interlayer shorting attributable to invasion of static electricity. The substrate has a first wiring section disposed in a display area thereof and formed so as to outwardly extend from the inside of the display area. The substrate also has a second wiring section formed such that it intersects the first wiring section outside the display area on the substrate with an insulation film interposed between them. The substrate further has an opening formed in the second wiring section at least in a region thereof overlapping the first wiring section intersecting the same. Further, the substrate has overlapping portions formed at two ends of the opening where the first and second wiring sections overlap each other with the insulation film interposed between them.

12 Claims, 10 Drawing Sheets

METHOD FOR REPAIRING A SHORT IN A SUBSTRATE FOR A DISPLAY AND DISPLAY REPAIRED ACCORDING TO THAT METHOD

BACKGROUND OF THE INVENTION

1. Field of the Invention

The present invention relates to a substrate for a display and, particularly, to a substrate for a liquid crystal display having thin film transistors (hereinafter referred to as "TFTs") as switching elements which can be easily repaired for defects such as breakage and inter-layer shorting attributable static electricity generated at manufacturing steps.

2. Description of the Related Art

Active matrix type liquid crystal displays are widely used as flat panel displays having high image quality in electronic apparatus such as computers and wide-screen television sets.

A liquid crystal display has an array substrate, an opposite substrate provided opposite to the array substrate, and a liquid crystal layer sealed between the array substrate and the opposite substrate. The array substrate has a pixel electrode formed at each of a plurality of pixel regions and a TFT connected to each pixel electrode as a switching element. An opposite electrode is formed on an entire surface of the opposite substrate. The liquid crystal display is enabled for display utilizing the liquid crystal by applying a voltage to the liquid crystal layer from the pixel electrodes and the opposite electrode.

FIG. 10 is a schematic view of a part of an array substrate taken on a surface of the substrate. As shown in the same figure, a plurality of gate bus lines 1010 are disposed in parallel with each other on an array substrate 1001, a scan signal for selecting pixel electrodes to be driven being sequentially input to the gate bus lines. A plurality of drain bus lines 1020 to which a gradation signal is input are disposed on the array substrate 1001 substantially orthogonally to the plurality of gate bus lines 1010.

A pixel region is constituted by each of rectangular regions defined in the form of a matrix by the plurality of gate bus lines 1010 and the plurality of drain bus lines 1020 which are orthogonal to each other. A display area (a) is constituted by an array of a plurality of such pixel regions. In each of the pixel regions, there is provided a TFT 1040, a pixel electrode 1030 and a storage capacitor element (or storage capacitor forming sections) 1050 for suppressing fluctuation of the potential at the pixel electrode 1030.

A plurality of storage capacitor bus lines 1060 is disposed on the array substrate 1001. The storage capacitor bus lines are formed in the horizontal direction in the figure in parallel with the gate bus lines 1010 in connection with the plurality of storage capacitor bus lines 1050. A storage capacitor common electrode section 1070, which combines the plurality of storage capacitor bus lines 1060 and serves as a common electrode for them, is disposed on the array substrate 1001 such that they extend in the direction of intersecting the gate bus lines 1010 (lengthwise direction in the figure). The storage capacitor common electrode section 1070 is formed on the gate bus lines 1010 with an insulation film (not shown) interposed between them.

A plurality of connection terminal sections such as TAB terminals are provided along each edge of the array substrate 1001. Predetermined signals are supplied to the gate bus lines 1010 and the drain bus lines 1020 from the connection terminal sections.

The gate bus lines 1010 and the drain bus lines 1020 are basically vulnerable to static electricity because they are formed on a glass substrate having insulating properties. For example, when static electricity generated on the array substrate 1001 flows in through the gate bus lines 1010 at a manufacturing step (in the direction indicated by the arrow E1 in the figure), it is discharged at regions where the gate bus lines 1010 and the storage capacitor common electrode section 1070 overlap each other to cause inter-layer shorting S. Static electricity not only originates from charging that occurs when the substrate is peeled off from a stage during manufacture but also can enter the substrate from the outside.

A gate bus line 1010 having inter-layer shorting S is subjected to the problem of line defects in the extending direction of the bus line, which results in a significant reduction in the yield of manufacture of panels. In particular, static electricity is likely to enter from the connection terminal sections, and static electricity which has entered in such a location can be discharged to a capacitor component that is present in its path to break down the capacitive section. In such a case, repair by using a laser beam must be performed to remove the shorting location S by cutting the gate bus line 1010, and the repair has been virtually impossible.

The trend toward larger liquid crystal displays with higher definition requires, the wiring width of a storage capacitor common electrode section 1070 to be great in order to reduce its resistance. As a result, since the surface area of overlapping regions where gate bus lines 1010 and a storage capacitor common electrode section 1070 overlap, the problem of the breakage of capacitive sections becomes more significant.

Patent Document 1: Japanese Unexamined Published Patent Application No. 2003-156763

SUMMARY OF THE INVENTION

It is an object of the invention to provide a substrate for a display which can be easily repaired even when it has problems such as inter-later shorting attributable to the invasion of static electricity.

The above-described object is achieved by a substrate for a display characterized in that it includes a first wiring section formed such that it outwardly extends from the inside of a display area on a substrate, a second wiring section formed such that it intersects the first wiring section outside the display area with an insulation film interposed between them, an opening provided in the second wiring section at least in a region thereof overlapping the first wiring section intersecting the same, and overlapping portions formed at two ends of the opening where the first and second wiring sections overlap with each other with the insulation film interposed between them.

According to the invention, since the plurality of overlapping portion having a redundant configuration is provided, even when an inter-layer shorting defect attributable to static electricity occurs at the other overlapping portion, the path of conduction of the second wiring section can be maintained by one of the overlapping portion, and the inter-layer shorting defect can be easily repaired. The yield of manufacture can therefore be improved.

DESCRIPTION OF THE PREFERRED EMBODIMENTS

Preferred embodiments of the invention will now be specifically described with reference to the drawings.

First Embodiment

General Configuration

Figure 1:
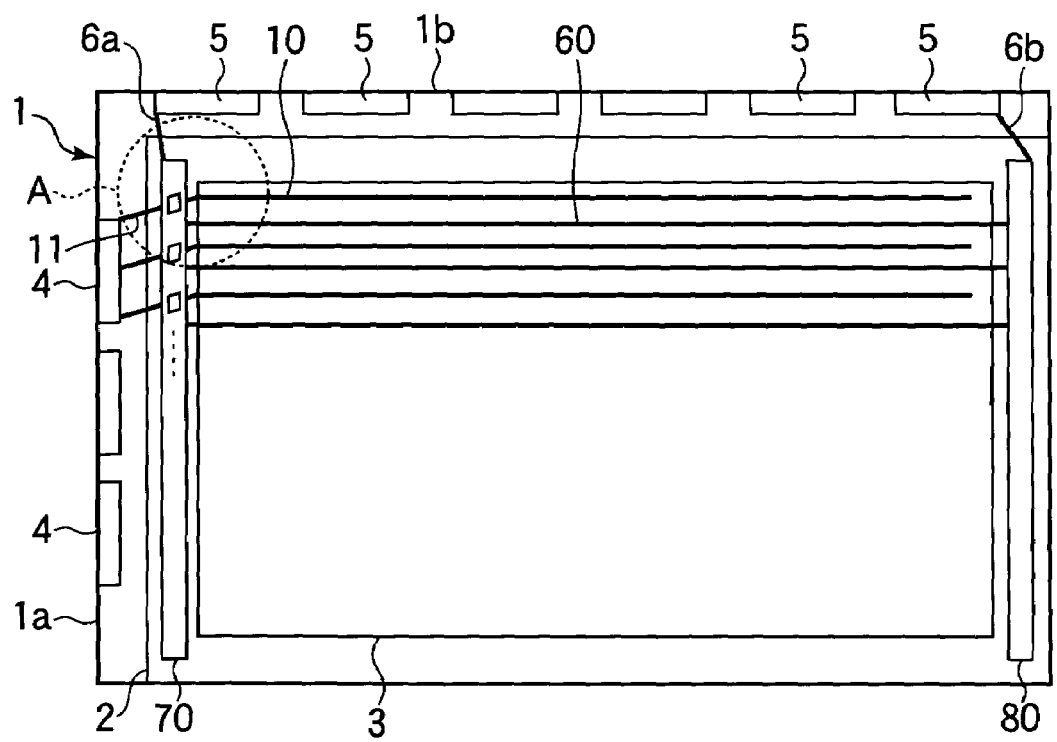
FIG. 1 is a plan view schematically showing a general configuration of a liquid crystal display according to a first embodiment of the invention.

First, a general configuration of a liquid crystal display utilizing a substrate for a display according to the invention will be schematically described with reference to FIG. 1. FIG. 1 schematically shows a general configuration of a liquid crystal display in the present embodiment, and it shows an array substrate of the liquid crystal display as viewed from a surface of the substrate.

The present embodiment represents a case in which storage capacitor common electrode sections are provided on two ends of an array substrate, the embodiment being characterized in that openings are provided at one of the two ends of the storage capacitor common electrode section in regions where the storage capacitor common electrode section intersects gate bus lines. A basic configuration of the liquid crystal display of the present embodiment will now be descried.

As shown in FIG. 1, the liquid crystal display of the present embodiment comprises an array substrate (a substrate for a display) 1 having a TFT and a pixel electrode formed in each pixel region thereof, an opposite substrate 2 disposed opposite to the array substrate 1 and having color filters and an opposite electrode for forming a vertical electric field formed thereon, and a liquid crystal layer (not shown) sealed between the array substrate 1 and the opposite substrate 2. A display area 3 is an area in which pixel electrodes (not shown) are arranged in the horizontal and vertical directions.

As shown in FIG. 1, the array substrate 1 comprises gate bus lines (first bus lines) 10 for supplying a scan signal to each of the pixel electrodes formed in the display area 3 at predetermined timing, a plurality of storage capacitor bus lines 60 connected to storage capacitor elements for improving display quality by suppressing fluctuation of the potential at each of the pixel electrodes and disposed such that they alternate with the gate bus lines 10 in parallel therewith, a storage capacitor common electrode section (Cs common electrode) 70 connected to respective ones of the plurality of storage capacitor bus lines 60 at one end thereof and formed at one end of the substrate to perform dual bank drive, a storage capacitor common electrode section 80 connected to respective ones of the plurality of storage capacitor bus lines 60 at one end thereof and formed at another end of the substrate, and drain bus lines (second bus lines), which are not shown in FIG. 1, formed substantially orthogonally to the plurality of gate bus lines 10 and the plurality of storage capacitor bus lines 60, the drain bus lines supplying a gradation signal at predetermined timing.

The gate bus lines 10 correspond to a "first wiring section" according to the invention, and the storage capacitor common electrode section 70 corresponds to a "second wiring section" according to the invention. However, this is not limiting the invention. The "first wiring section" according to the invention may include the gate bus lines 10 and the drain bus lines (not shown in FIG. 1), and the "second wiring section" according to the invention may include the storage capacitor bus lines 60 and the storage capacitor common electrode sections 70 and 80.

The array substrate 1 is formed greater than the opposite substrate 2, and two sides of the substrate 1 project beyond the opposite substrate 2 to form regions for providing driving circuits. A plurality of gate TAB (Tape Automated Bonding) terminals (external connection terminals) 4 that combine a plurality of the gate bus lines 10 are formed at an end 1a of one of the projecting regions, and a plurality of drain TAB terminals (external connection terminals) 5 that combine a plurality of the drain bus lines are formed at an end 1b of the other projecting region.

Further, connection lines 6a and 6b extending from the storage capacitor common electrode sections 70 and 80 are connected to the drain TAB terminals 5 located at two ends of the array substrate 1 in addition to drain bus lines.

Some of the plurality of gate bus lines 10 are connected to the gate TAB terminals 4 by providing them with lead-out parts which are the portions led out from the gate bus lines 10 in the state of bending and inclined.

The storage capacitor common electrode sections 70 and 80 are formed at two ends of the substrate in order to cope with the cases in which the storage capacitor bus lines 60 have a greater wiring length or in a greater quantity by supplying a voltage from both sides of the storage capacitor bus lines 60.

The gate bus lines 10 and the storage capacitor common electrode section 70 overlap each other with an insulation film interposed between them, and the storage capacitor common electrode section 70 is configured to have openings in the overlapping regions. The configuration will be specifically described below.

(Detailed Configuration of the Array Substrate 1 of the Embodiment)

Figure 2:
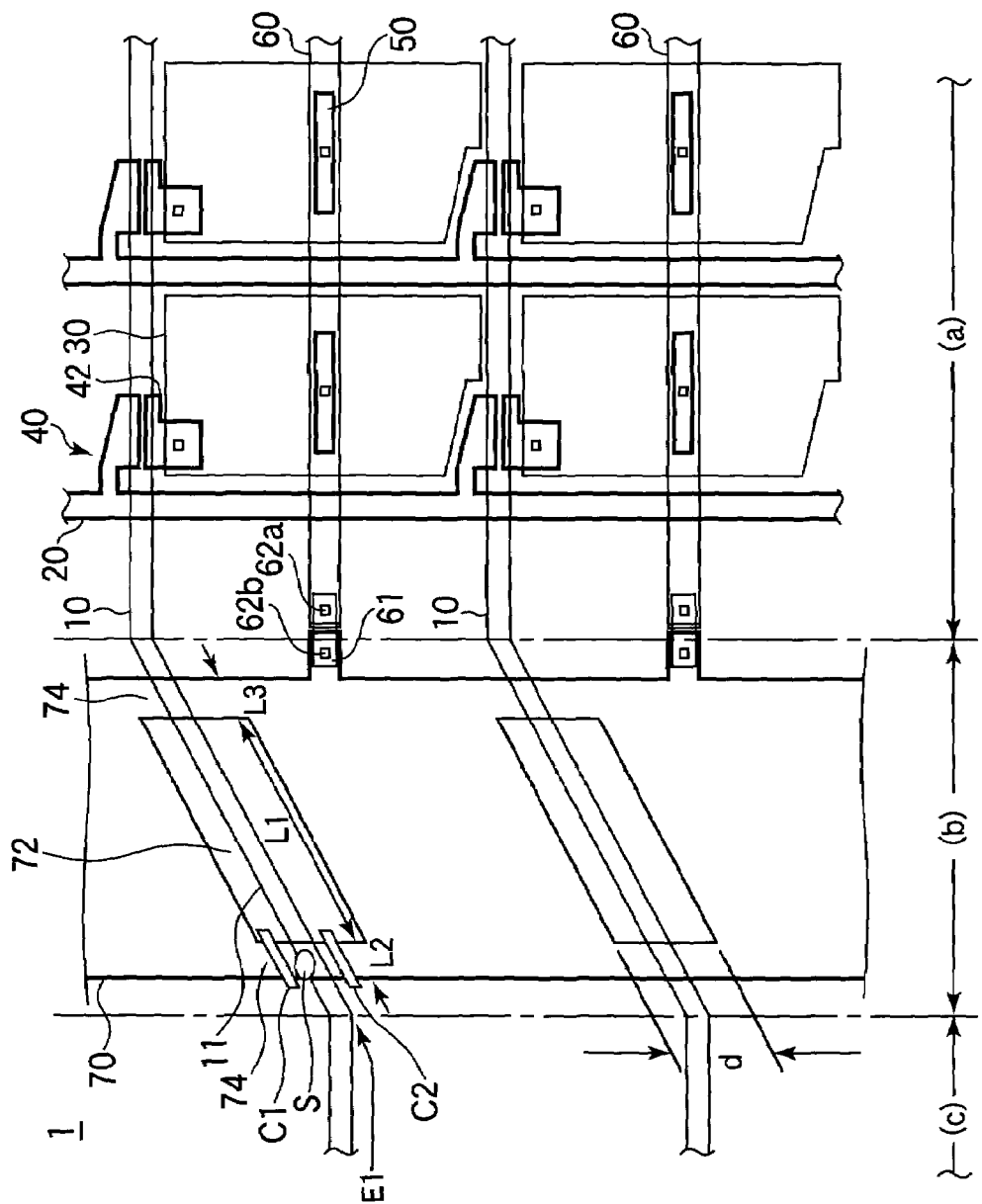
FIG. 2 shows an example of a configuration of a partial surface of a substrate for a display according to the first embodiment of the invention.

A description will now be made with reference to FIG. 2 on a feature of the present embodiment, i.e., a specific configuration of the storage capacitor common electrode section 70 of the array substrate 1. FIG. 2 shows a configuration of the array substrate 1 of the active matrix type liquid crystal display of the present embodiment on which pixel electrodes are formed, FIG. 2 showing a plurality of pixel regions as viewed in a direction toward the surface of the substrate. FIG. 2 is an enlarged view of the part of FIG. 1 enclosed by the circle A in a broken line. FIG. 2 does not illustrate the external connection terminals shown in FIG. 1.

As shown in FIG. 2, the array substrate 1 is formed with the plurality of gate bus lines 10 (two of which are shown in FIG. 2) extending in the horizontal direction of the figure in parallel with each other and the plurality of drain bus lines 20 (two of which are shown in FIG. 2) extending in the vertical direction in parallel with each other such that they are substantially orthogonal to the plurality of gate bus lines 10.

The array substrate 1 is also formed with the pixel electrode 30 and the TFT (driving element) 40 disposed at each of intersections between the plurality of gate bus lines 10 and the plurality of drain bus lines 20 and the storage capacitor element 50 disposed in association with each of the pixel electrodes 30.

A storage capacitor element 50 includes a storage capacitor electrode (intermediate electrode) that is aligned with the center of the pixel electrode 30 and connected to the same through a contact hole, an insulation film formed under the storage capacitor electrode, and a storage capacitor opposite electrode part of a storage capacitor bus line 60 formed under the insulation film, the part being a partial area of the bus line facing the storage capacitor electrode. The storage capacitor element 50 forms a storage capacitor one electrode of which is constituted by the storage capacitor electrode and another electrode of which is constituted by the storage capacitor opposite electrode part of the storage capacitor bus line 60.

On the array substrate 1, when each of the TFTs 40 is turned on, a predetermined potential is written at the pixel electrode 30 to control a voltage applied to the liquid crystal layer in the pixel region. The voltage applied to the liquid crystal layer must be maintained until the next frame even if the TFT 40 is turned off. However, the potential at the pixel electrode 30 fluctuates in one frame period due to a parasitic capacitance generated at the TFT 40 or a leak current generated between the pixel electrode 30 and the common electrode. For this reason, the voltage applied to the liquid crystal layer is maintained for one frame by suppressing fluctuation of the potential at the pixel electrode 30 with the storage capacitor element 50.

Some of the plurality of gate bus lines 10 have a bent part 11 which is bent such that it is inclined to be directed from the display area (a) toward a gate TAB terminal 4 (not shown in FIG. 2). The bent part 11 is formed over a width (b) of the storage capacitor common electrode section 70. The gate TAB terminals 4 are formed in a region (c) outside the position where the storage capacitor common electrode section 70 is disposed. Some gate bus lines 20 are not required to have the bent part 11 to be connected with the gate TAB terminals 4 depending on the position where the gate bus lines 20 are formed.

A storage capacitor bus line 60 is electrically connected to the storage capacitor common electrode section 70 through a connection electrode 61 and connection parts 62a and 62b.

The storage capacitor common electrode section 70 is stacked on the gate bus lines 10 in a position outside the display area (a) with an insulation film (not shown) interposed between them, and it is formed with openings 72 in regions where it overlaps the gate bus lines 10.

An opening 72 extends along the bent part 11 of a gate bus line 10. The length of the openings 72 is represented by L1. The length of the storage capacitor common electrode section 70 from one end in the width direction thereof to one end of an opening 72 is represented by L2. The length of the storage capacitor common electrode section 70 from another end in the width direction thereof to another end of the opening 72 is represented by L3.

Thus, two overlapping portions 74 having the length L2 and L3, respectively, are formed for each gate bus line 10. An overlapping portion 74 includes the storage capacitor common electrode section 70, the insulation film formed under the storage capacitor common electrode section 70 and the gate bus line 10 formed under the insulation film.

According to the related art, since a storage capacitor common electrode section 70 is formed with no opening, when inter-layer shorting is repaired by performing laser beam cutting, the conduction of the storage capacitor common electrode section 70 is shut off. On the contrary, in the case of the storage capacitor common electrode section 70 of the present embodiment, the provision of the openings 72 makes it possible to form a redundant configuration in which at least two overlapping portions 74 are provided for each gate bus line 10. As a result, even when there is a shorting part S in either of the overlapping portion 74, the path of conduction of the storage capacitor common electrode section 70 can be maintained by the other overlapping portion 74. The yield of manufacture can be thus improved.

The openings 72 are formed with a length d that is slightly greater than the width of the gate bus lines 10 in the direction in which the storage capacitor common electrode section 70 extends. There is no need for providing openings in regions other than the regions overlapping the gate bus lines 10 because no inter-layer shorting can occur in such regions. It is therefore possible to minimize the area of the openings 72 and to provide the storage capacitor common electrode section 70 with a ladder structure that minimizes any unnecessary increase in the resistance of the storage capacitor common electrode section 70. The storage capacitor common electrode section 70 can therefore be formed substantially free of changes in resistance by such a ladder structure.

The length L1 of the openings 72 is preferably made as large as possible, and the lengths L2 and L3 of the respective overlapping portion 74 are preferably made as short as possible. That is, a reduction in the area of the overlaps between the gate bus lines 10 and the storage capacitor common electrode section 70 allows capacitive components associated with the gate bus lines 10 to be made small, and an additional effect can therefore be provided in that the waveform of a gate pulse can be prevented from being rounded. In particular, the storage capacitor common electrode section 70 must have a great line width in the range from 500 to 1500 μm, for example, at a resolution equal to or higher than that according to XGA (1024×768). Even when there is such a requirement for the line width, the formation of the openings 72 makes it possible to reduce capacitances, which form a part of capacitive components of the gate bus lines 10, in the regions where the gate bus lines overlap the storage capacitor common electrode section 70, and the waveform of a gate pulse can be thus prevented from being rounded. Further, a repair can be easily performed when the lengths L2 and L3 of the overlapping portion 74 are small because a shorting part S formed in an overlapping portion 74 can be easily cut off through laser beam cutting.

Gate electrodes of the TFTs 40, the gate bus lines 10 and the storage capacitor bus lines 60 are formed in the same conductive layer (a first conductive layer). Source electrodes and drain electrodes of the TFTs 40, the drain bus lines 60 and the storage capacitor common electrode section 70 are formed in the same conductive layer (a second conductive layer). The pixel electrodes 30 and the connection electrodes 61 are formed in the same conductive layer (a third conductive layer). An insulation film is formed between each pair of the conductive layers to prevent shorting between the conductive layers.

(Method of Repairing Shorting Part)

The liquid crystal display of the present embodiment has the above-described configuration and operates as follows. First, let us assume that static electricity E1 generated at a step for manufacturing the array substrate 1 enters the position where the storage capacitor common electrode section 70 is disposed through a gate bus line 10 from the side of the gate TAB terminals 4 outside the display area.

When the static electricity E1 enters, inter-layer shorting occurs, for example, in a shorting part S at the overlapping portion 74 on the left in FIG. 2. Then, in order to repair the shorting part S, an inspection such as pattern recognition is performed to identify the shorting part.

Next, laser beam cutting is performed to cut the storage capacitor common electrode section 70 in cutting positions C1 and C2 at both ends of the shorting part S by irradiating the positions with a laser beam. At this time, since the overlapping portion 74 to be cut has a small length L2, it can be easily cut. By cutting the storage capacitor common electrode section 70 in the overlapping portion 74 as thus described, the storage capacitor common electrode section 70 and the gate bus line 10 can be electrically isolated from each other in the shorting part S.

The inter-layer shorting can be thus repaired, and the array substrate 1 will not become defective. The repair of the defect is thus completed. The repair involves no repair of the gate bus line 10.

In the redundant configuration formed by the two overlapping portion 74, even when there is a shorting part S in either of the overlapping portion 74 formed on the side of the gate TAB terminals 4, the path of conduction of the storage capacitor common electrode section 70 can be maintained at another overlapping portion 74.

As described above, in the present embodiment, two overlapping portions 74 having a redundant configuration can be formed at the storage capacitor common electrode section 70. As a result, even when an inter-layer shorting defect occurs on either of the overlapping portions 74 due to static electricity generated at a manufacturing step, a repair can be performed with the path of conduction of the storage capacitor common electrode section 70 maintained by the other overlapping portion 74, which improves the yield of manufacture.

Further, the storage capacitor common electrode section 70 can be formed such that it undergoes substantially no change in resistance by forming the openings 72 to provide the storage capacitor common electrode section 70 with a ladder structure and making the area of the openings 72 as small as possible.

Since the overlapping portion 74 have a small area, it is possible to reduce rounding of the waveform of a gate pulse flowing through the gate bus lines 10. In particular, the formation of the openings 72 makes it possible to reduce waveform rounding even when a great line width is required. Further, a shorting part S formed at an overlapping portion 74 can be easily cut off using laser beam cutting.

Furthermore, since no shorting can occur at the openings 72, shorting can be limited to intersecting regions of the overlapping portion other than the openings. Thus, the scale of shorting (the area of a shoring region) per bus line can be minimized.

When projecting regions for providing driving circuits are made small in order to satisfy demand for a smaller frame, the wiring of the bent parts 11 of the gate bus lines 10 will be steeply inclined in some regions. Although this results in an increase in the area where the storage capacitor common electrode section 70 overlaps the gate bus lines 10, the formation of the openings 72 according to the present embodiment makes it possible to reduce the area of the overlaps, thereby suppressing rounding of the waveform of a gate pulse.

In addition, the present embodiment can be carried out without increasing the number of manufacturing steps because it different from an array substrate according to the related art only in the configuration of storage capacitor common electrode sections.

Second Embodiment

Figure 3:
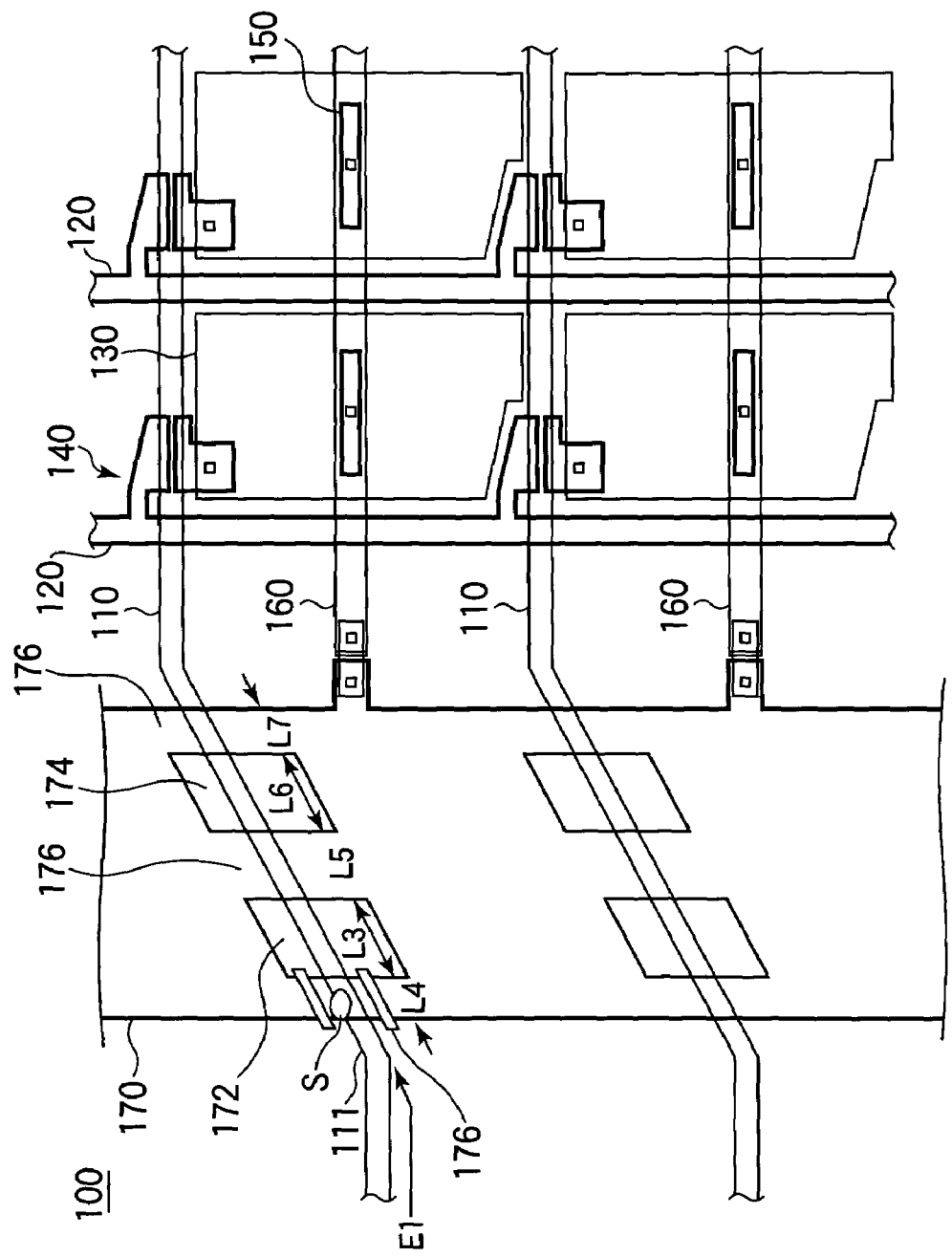
FIG. 3 shows an example of a configuration of a partial surface of a substrate for a display according to a second embodiment of the invention.

A second embodiment of the invention will now be described with reference to FIG. 3. In the following, features which have substantially identical counterparts in the first embodiment will not be described, and the description will address areas in which changes are made only. FIG. 3 shows an example of a configuration of a part of a surface of a substrate for a display according to the second embodiment of the invention.

The above-described first embodiment employs a configuration in which one opening 72 is disposed at the storage capacitor common electrode section 70 for each gate bus line 10. The present embodiment employs a configuration in which redundancy is increased by providing a plurality of openings, e.g., two openings 172 and 174 for each gate bus line 110 to form three overlapping portions 176.

Specifically, as shown in FIG. 3, an array substrate 100 included in a liquid crystal display comprises gate bus lines 110, drain bus lines 120, pixel electrodes 130, thin film transistors 140, storage capacitor bus lines 160 and a storage capacitor common electrode section 170 similarly to the first embodiment.

The storage capacitor common electrode section 170 has two openings 172 and 174 extending along a bent part 111 of each gate bus line 110 and three overlapping portions 176. An opening width L3 of the opening 172 and an opening width L6 of the opening 174 are substantially equal to each other. Two of the overlapping portion 176 are formed with a width L4 and a width L7, respectively, which are substantially equal, and the other overlapping portion 176 is formed with a width L5 which is greater than the widths L4 and L7.

The entire area of the two openings 172 and 174 is smaller than the area of one opening 72 (FIG. 2) in the first embodiment. That is, the sum of the width L3 and the width L6 in FIG. 3 is smaller than the width L2 in FIG. 2.

In the array substrate 100 having the above-described configuration, the following effects are provided when static electricity enters the same in the direction of the arrow E1. Specifically, when inter-layer shorting occurs at a shorting part S, the periphery of the shorting part S is cut using a laser.

Since the openings 172 and 174 are formed, two out of three current paths are maintained even though one of the current paths is broken as a result of laser beam cutting.

Further, inter-layer shorting may sequentially proceed in the entering direction E1 along the gate bus line 110. That is, shorting can occur in each of the overlapping portion 176 having the width L4 and the overlapping portion 176 having the width L5. In this case, since a current path can be maintained by the overlapping portion 176 having the width L7, the storage capacitor common electrode section 170 can be used as it is even if each of the overlapping portion 176 having the width L4 and the overlapping portion 176 having the width L5 is cut for repair using laser beam cutting.

As described above, in the present embodiment, the two openings 172 and 174 are provided to form three overlapping portions 176 where the storage capacitor common electrode section 170 and the gate bus line 110 overlap each other. Thus, even when one or two of the three current paths are broken as a result of laser beam cutting, the other current path can be maintained.

Third Embodiment

Figure 4:
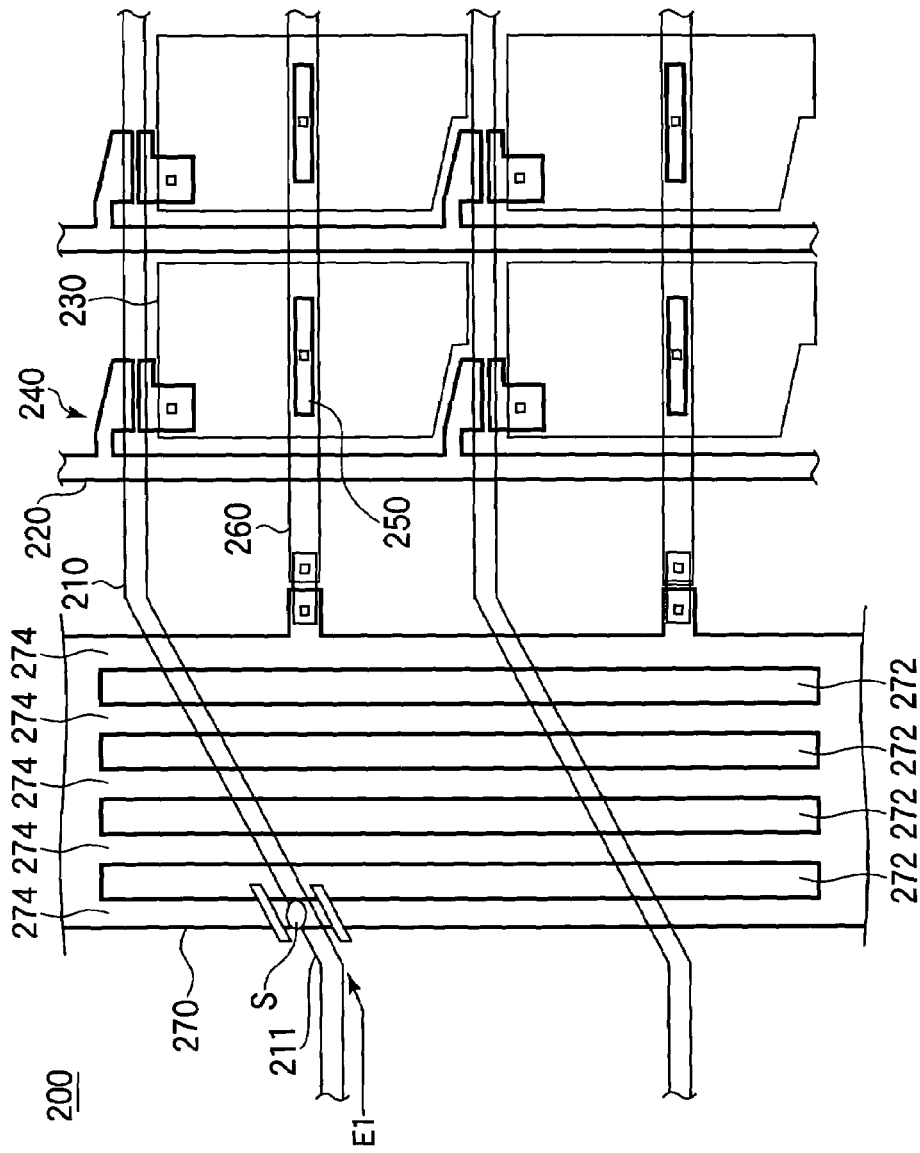
FIG. 4 shows an example of a configuration of a partial surface of a substrate for a display according to a third embodiment of the invention.

A third embodiment of the invention will now be described with reference to FIG. 4. FIG. 4 shows an example of a configuration of a part of a surface of a substrate for a display according to the present embodiment of the invention. In the following, features which have substantially identical counterparts in the first and second embodiments will not be described, and the description will address areas in which changes are made only.

The above-described first and second embodiments employ a configuration in which an opening 72 is formed along the extending direction of one gate bus line 10. The present embodiment employs a configuration in which openings 272 are formed in the extending direction of a storage capacitor common electrode section 270.

Specifically, as shown in FIG. 4, an array substrate 200 of the present embodiment comprises gate bus lines 210 having a bent part 211, drain bus lines 220, pixel electrodes 230, thin film transistors 240, storage capacitor bus lines 260 and a storage capacitor common electrode section 270 similarly to the first embodiment.

An elongate opening 272 in the storage capacitor common electrode section 270 is formed such that it is longer in the extending direction of the storage capacitor common electrode section 270. A plurality of the openings 272, e.g., four openings 272 are formed and arranged in the direction in which gate bus lines 210 extend. As a result, five overlapping portions 274 are formed.

Such a configuration of the openings 272 provides the following effects. In the first and second embodiments, each of the openings 272 must be formed in accordance with the wiring pattern of a gate bus line 10. On the contrary, in the present embodiment, since the openings 272 in the storage capacitor common electrode section 270 are formed as openings which are longer in the wiring extending direction of the storage capacitor common electrode section 270, there is no need for redesigning the storage capacitor common electrode section 270 even if a design change is made to the wiring pattern of the gate bus lines 210.

For example, referring to the intervals between the gate bus lines 210 arranged in parallel with each other, since the pitch of the lines in a display area is different from the pitch at which the lines are extended from the display area and disposed on the side of external connection terminals, it may be inevitable to form bent parts 211 in some regions. In this case, the inclination of each bent part is different for each gate bus line 210. For this reason, it has been necessary in cases like the first and second embodiments to vary the position and shape of each opening 72 depending on the wiring pattern of the gate bus line 10, e.g., the inclination of the bent part 11 of the gate bus line 10. The design of the openings 272 of the storage capacitor common electrode section 270 can be simplified by forming them in an elongate shape according to the present embodiment, which allows burdens associated with layout designing to be reduced.

In particular, in the case of a liquid crystal display panel having narrow projecting regions, the inclination of gate bus lines 210 may be very steep compared to that in a liquid crystal display panel having wide projecting regions. In such a case, since the elongate openings 272 can be uniformly formed regardless of the layout of the gate bus lines 210, the storage capacitor common electrode section 270 including the openings 272 can be fabricated easily. Further, a repair can be easily carried out in the case of inter-layer shorting.

Fourth Embodiment

Figure 5:
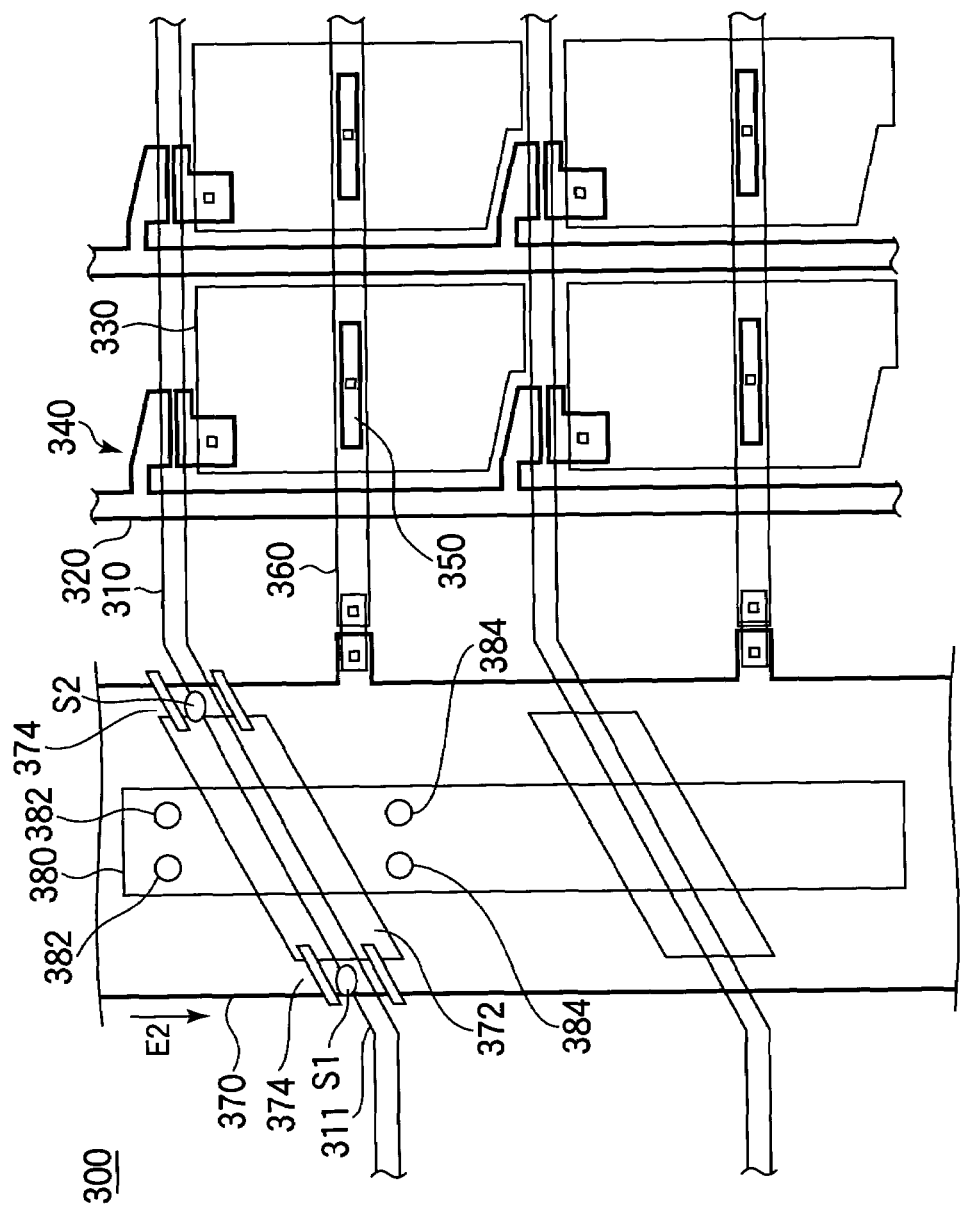
FIG. 5 shows an example of a configuration of a partial surface of a substrate for a display according to a fourth embodiment of the invention.

A fourth embodiment of the invention will now be described with reference to FIG. 5. FIG. 5 shows an example of a configuration of a part of a surface of a substrate for a display according to the present embodiment of the invention. In the following, features which have substantially identical counterparts in the first embodiment will not be described, and the description will address areas in which changes are made only.

The present embodiment employs a configuration in which a bypass wiring 380 is disposed in the wiring direction of a storage capacitor common electrode section 370 such that they overlap each other with an insulation film interposed between them. Specifically, as shown in FIG. 5, an array substrate 300 of the present embodiment comprises gate bus lines 310, drain bus lines 320, pixel electrodes 330, thin film transistors 340, storage capacitor bus lines 360, a storage capacitor common electrode section 370 and a bypass wiring 380. The bypass wiring 380 corresponds to a "third wiring section" according to the invention.

The storage capacitor common electrode 370 has openings 372 opening in the direction along the gate bus lines 310. As a result, two overlapping portions 374 are formed.

The bypass wiring 380 is formed in the wiring direction of the storage capacitor common electrode section 370 across a plurality of the openings 372 and formed above the storage capacitor common electrode section 370 with an insulation film interposed.

Connection parts 382 and 384 electrically connect the bypass wiring 380 and the storage capacitor common electrode section 370, and they are formed by fusing the storage capacitor common electrode section 380 by irradiating it with laser beams at a step of repairing the same. Referring to FIG. 5, for example, four connection parts 382 and 384 are formed in total for one opening 372. Thus, the bypass wiring 380 can be provided with the same function as that of the storage capacitor common electrode section 370.

The above-described configuration of the array substrate 300 provides the following effects. External static electricity does not necessarily enter through the gate bus lines 310, and static electricity may flow in from the side of drain TAB terminals (the upper side in FIG. 5) at one end of the storage capacitor common electrode section 370 in the wiring direction thereof as indicated by the arrow E2.

In such a case, inter-layer shorting may occur in a plurality of locations, and shorting parts S1 and S2 appear in respective overlapping portions 374. Both of the shorting parts S1 and S2 are cut using laser beam cutting, and the bypass wiring 380 is irradiated with laser beams to form the connection parts 382 and 384.

As a result, a path of conduction can be maintained by the bypass wiring 380 and the connection parts 382 and 384 even though both of the shorting parts S1 and S2 are cut using laser beam cutting to allow the storage capacitor common electrode section 370 to be repaired.

In addition, the connection parts 382 and 384 can be easily formed at the position irradiated with laser beams used for cutting the shorting parts S1 and S2 at the repairing step. The positions of the connection parts 382 and 384 may be freely determined depending on positions where shorting has occurred.

The bypass wiring 380 is preferably formed by patterning a transparent electrode (ITO: Indium Tin Oxide) layer used as pixel electrodes on an insulation film provided on the storage capacitor common electrode section 370.

Outside a display area, the gate bus lines 310 (first layer), an insulation film (second layer), the storage capacitor common electrode section 370 (third layer), a second insulation film (fourth layer) and the bypass wiring 380 (fifth layer) are stacked in the order listed on a substrate having insulating properties. In a part of the display area (pixel regions), the storage capacitor bus lines 360 (first layer), an insulation film (second layer), storage capacitor electrodes (third layer), a second insulation film (fourth layer) and the pixel electrodes 330 (fifth layer) are stacked in the order listed on the substrate having insulating properties.

Thus, the bypass wiring 380 that is the fifth layer may be formed as the same layer as the pixel electrodes 330 from the same material at the same time. Therefore, the wiring can be provided using the same material as that of the transparent electrode layer without forming it using a different material separately, which eliminates any need for an additional process.

Even though the openings 372 are formed in the storage capacitor common electrode section 370, since the bypass wiring 380 is provided, the sum of the areas of the bypass wiring 380 and the storage capacitor common electrode section 370 allows resistance to be kept low.

Fifth Embodiment

Figure 6:
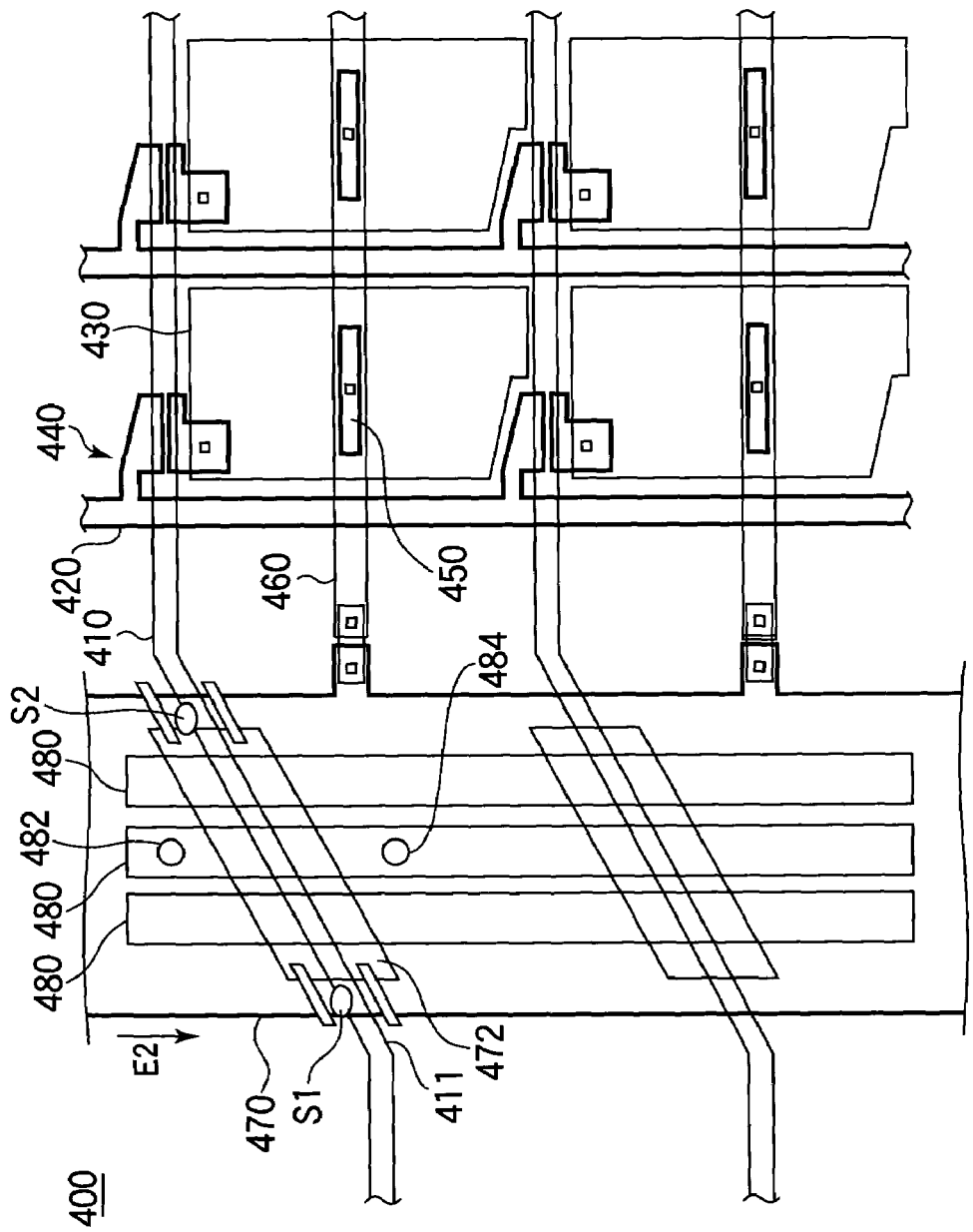
FIG. 6 shows an example of a configuration of a partial surface of a substrate for a display according to a fifth embodiment of the invention.

A fifth embodiment of the invention will now be described with reference to FIG. 6. FIG. 6 shows an example of a configuration of a part of a surface of a substrate for a display according to the present embodiment of the invention. In the following, features which have substantially identical counterparts in the first through fourth embodiments will not be described, and the description will address areas in which changes are made only.

The above-described fourth embodiment employs a configuration in which one bypass wiring 380 is disposed on the storage capacitor common electrode section 370. The present embodiment employs a configuration in which a plurality of bypass wirings 480 is disposed on a storage capacitor common electrode section 470. Specifically, as shown in FIG. 6, an array substrate 400 of a liquid crystal display of the present embodiment comprises gate bus lines 410, drain bus lines 420, pixel electrodes 430, thin film transistors 440, storage capacitor bus lines 460, a storage capacitor common electrode section 470 and a plurality of bypass wirings 480 (three of which are shown in FIG. 6).

The storage capacitor common electrode section 470 has openings 472 extending along the gate bus lines 410. Each of the plurality of bypass wirings 480 is formed along the wiring direction of the storage capacitor common electrode section 470 such that it extents across the plurality of openings 472 to cover them, and the wirings are formed above the storage capacitor common electrode section 470 with an insulation film interposed between them.

The bypass wiring 480 in the middle is formed with connection parts 482 and 484 which are electrically connected to the storage capacitor common electrode section 470. The connection parts 482 and 484 are formed by fusing the storage capacitor common electrode section 470 by irradiating it with laser beams at a step of repairing the same. Two connection parts 482 and 484 are formed in total on the bypass wiring 480 in the middle.

On the array substrate 400 having the above-described configuration, the following effects are provided. Static electricity can also enter in the wiring direction of the storage capacitor common electrode section 470 from the side of external storage capacitor TAB terminals (the upper side in FIG. 6) as indicated by the arrow E2.

When inter-layer shorting occurs in two shorting parts S1 and S2 due to static electricity flowing in the direction E2, the bypass wirings 480 maintains a path of conduction through the connection parts 482 and 484 even if those parts are cut using laser beam cutting.

Inter-layer shorting attributable to the flow of static electricity from the gate bus lines 410 occurs not only in the shorting parts S1 and S2 but also between the gate bus lines 410 and the bypass wirings 480 because the openings 472 are formed in the storage capacitor common electrode section 470. Since the plurality of bypass wirings 480 are formed, the storage capacitor common electrode section 470 can be easily repaired also in such a case.

As described above, in the present embodiment, since the plurality of bypass wirings 480 are formed, even when all of overlapping portions of the storage capacitor common electrode section 470 are shorted by a flow of static electricity in various directions, any of the plurality of bypass wirings 480 can be used. Thus, the conduction of the storage capacitor common electrode section 470 can be maintained, and the panel as a whole can be repaired only by repairing shorting parts and connecting the bypass wirings 480 using laser beams.

Sixth Embodiment

Figure 7:
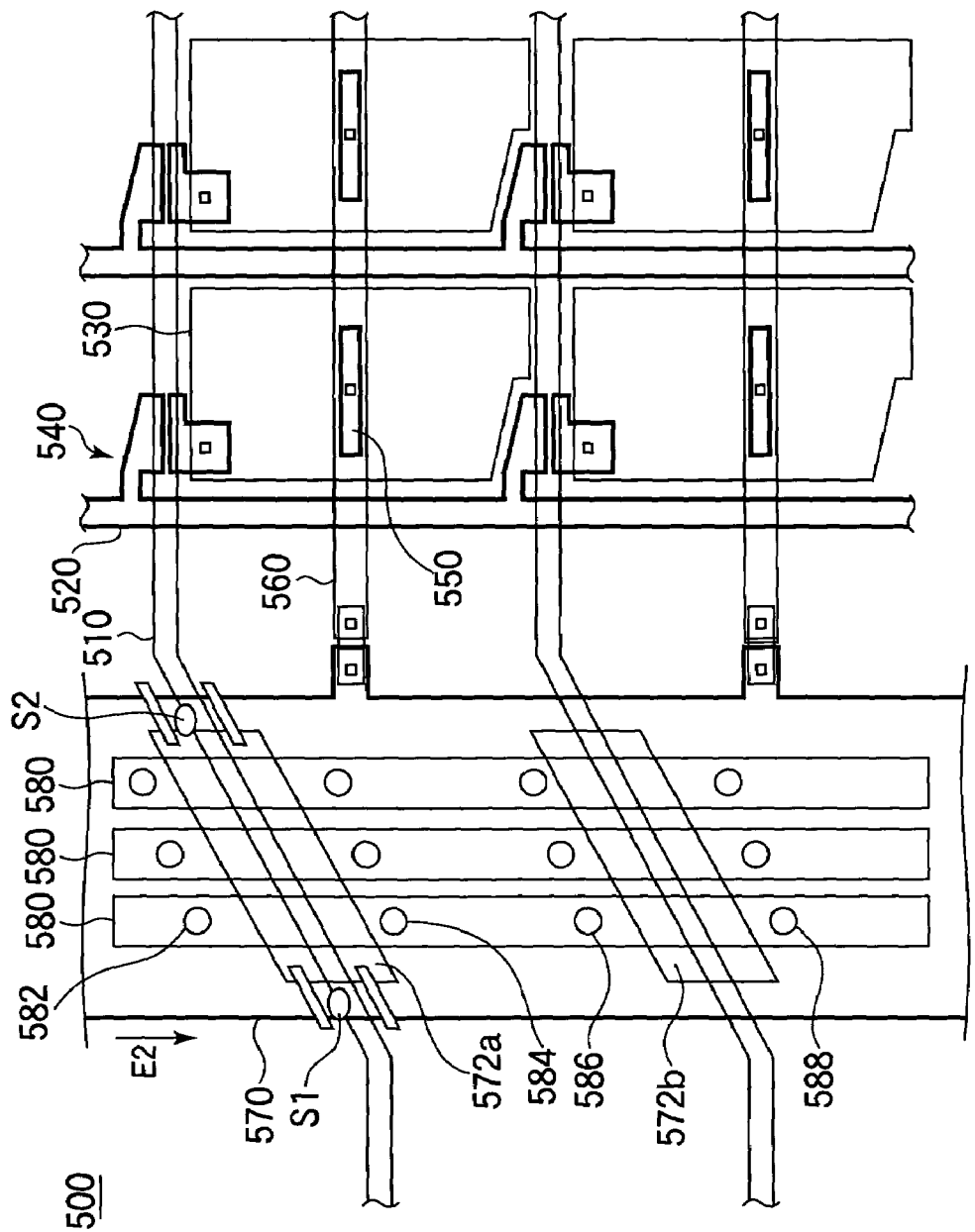
FIG. 7 shows an example of a configuration of a partial surface of a substrate for a display according to a sixth embodiment of the invention.

A sixth embodiment of the invention will now be described with reference to FIG. 7. FIG. 7 shows an example of a configuration of a part of a surface of a substrate for a display according to the present embodiment of the invention. In the following, features which have substantially identical counterparts in the first through fifth embodiments will not be described, and the description will address areas in which changes are made only.

The above-described fifth embodiment employs a configuration in which laser beam connection is performed as a process for electrically connecting the storage capacitor common electrode section 470 and the plurality of bypass wirings 480. The present embodiment employs a configuration in which contact holes are formed in advance. Specifically, as shown in FIG. 7, an array substrate 500 of a liquid crystal display of the present embodiment comprises gate bus lines 510, drain bus lines 520, pixel electrodes 530, thin film transistors 540, storage capacitor bus lines 560, a storage capacitor common electrode section 570 and a plurality of bypass wirings 580 (three wirings in the illustrated example).

The storage capacitor common electrode section 570 has openings 572a and 572b extending along the gate bus lines 510.

A plurality of the bypass wirings 580, e.g., three wirings are formed such that each of them extends in the wiring direction of the storage capacitor common electrode section 570 across the plurality of openings 572a and 572b and are stacked on the storage capacitor common electrode section 570 with a second insulation film interposed between them.

The bypass wirings 580 are electrically connected to the storage capacitor common electrode section 570 through connection parts 582, 584, 585 and 586. Let us focus the description on one bypass wiring 580. A path of conduction is maintained for one opening 572a by forming a connection part 582 above the opening in the figure and another connection part 584 under the opening, and a connection part 586 and a connection part 588 are also formed for another opening 572b above and under the same in the figure. The three bypass wirings 580 are provided side by side for the single opening 572a.

The connection parts 582, 584, 586 and 588 are electrically connected to the bypass wirings 580 and the storage capacitor common electrode section 570 through the contact holes formed by providing openings in an insulation film which is not shown.

The present embodiment employs a configuration in which the plurality of bypass wirings 580 and the storage capacitor common electrode section 570 are connected in advance through the plurality of connection parts 582, 584, 586 and 588 for each gate bus line 510.

Therefore, even when shorting occurs between one of the bypass wirings 580 and the gate bus line 510 in addition to shorting parts S1 and S2 attributable to the invasion of static electricity in respective directions, another bypass wiring 580 can be used. It is therefore possible to maintain conduction of the storage capacitor common electrode section 570 using the other bypass wiring 580 and to thereby repair the panel as a whole.

Since the area of the storage capacitor common electrode section 570 includes the area of the bypass wirings 580, a reduction in resistance can be achieved.

Further, since the layer thickness between the gate bus lines 510 and the storage capacitor common electrode section 570 is different from the layer thickness between the gate bus lines 510 and the bypass wirings 580, the bypass wirings 580 can be made less vulnerable to static electricity, which is preferable in that inter-layer shorting is unlikely to occur between the bypass wirings 580 and the gate bus lines 510. A configuration may alternatively employed, in which the thickness of the film between the layers of the bypass wirings 580 and the storage capacitor common electrode section 570 is increased.

Seventh Embodiment

Figure 8:
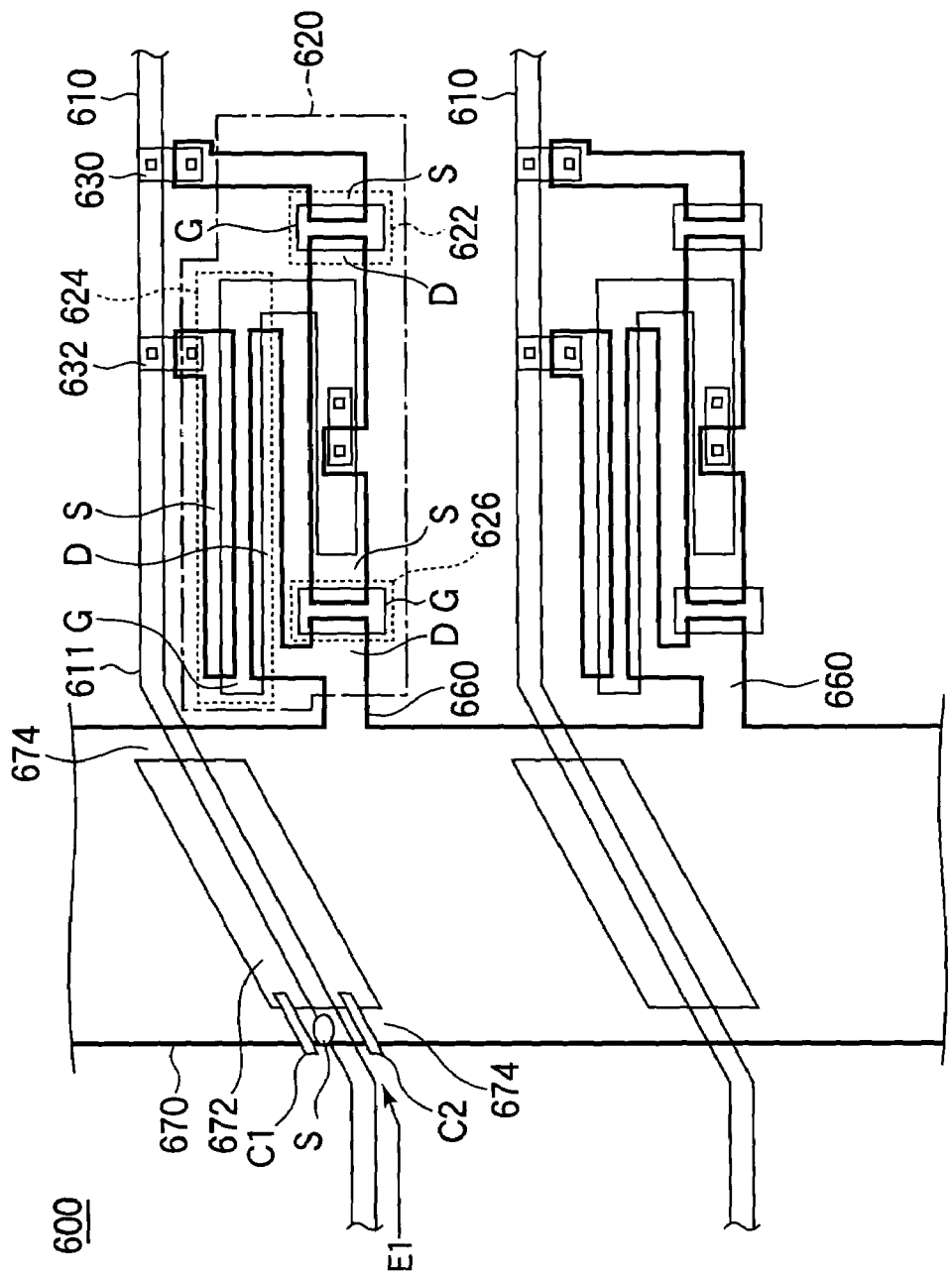
FIG. 8 shows an example of a configuration of a partial surface of a substrate for a display according to a seventh embodiment of the invention.

A seventh embodiment of the invention will now be described with reference to FIG. 8. FIG. 8 shows an example of a configuration of a part of a surface of a substrate for a display according to the present embodiment of the invention. In the following, features which have substantially identical counterparts in the first through sixth embodiments will not be described, and the description will address areas in which changes are made only.

While the above-described first through sixth embodiments are configured to facilitate a repair on inter-layer shorting between a gate bus line 10 and a storage capacitor common electrode section 70, the present embodiment addresses a case in which shorting occurs between an anti-ESD (electrostatic discharge) common electrode section 670 for combining wirings for ESD protection section and a gate bus line 610.

FIG. 8 shows an example of a structure of Anti-ESD sections 620 for which an anti-ESD common electrode section 670 is formed. As shown in FIG. 8, an array substrate 600 has gate bus lines 610, ant-ESD sections 620 connected to the gate bus lines 610 for preventing breakage of TFTs attributable to static electricity, and anti-ESD bus lines 660 formed so as to extend from the anti-ESD section 620.

Further, the array substrate 600 has the anti-ESD common electrode section 670 at which the plurality of anti-ESD bus lines 660 are combined. The anti-ESD common electrode section 670 is formed between a display area and gate TAB terminals (not shown) such that it extends in a direction across the gate bus lines 610 (the vertical direction in the figure).

The gate bus lines 610 correspond to the "first wiring section" according to the invention, and the anti-ESD common electrode section 670 corresponds to the "second wiring section" according to the invention. However, this is not limiting the invention, and the "first wiring section" according to the invention may include the gate bus lines 10 and drain bus lines (not shown in FIG. 1), and the "second wiring section" according to the invention may include the anti-ESD bus lines 660 and the anti-ESD common electrode section 670, and the storage capacitor bus lines 60 and the storage capacitor common electrode sections 70 and 80 in the first embodiment as well.

An anti-ESD section 620 is an anti-ESD circuit constituted by, for example, a first TFT 622 that is a first switching element connected to a gate bus line 610, a second TFT 624 that is a second switching element connected to the gate bus line 610, and a third TFT 626 connected to the first TFT 622, the second TFT 624 and an anti-ESD bus line 660.

Gate electrodes G of the first through third TFTs 622, 624 and 626 are formed on a glass substrate at the same time when the gate bus lines 610 and gate electrodes of TFTs in pixel regions are formed. The gate electrodes G of the first and third TFTs 622 and 626 are formed so that they are electrically isolated from other wiring structures.

Source electrodes S and drain electrodes D of the first through third TFTs 622, 624 and 626 are formed simultaneously with the formation of the anti-ESD bus lines 660 and the anti-ESD common electrode section 670 from the same material. The source electrode S of a first TFT 622 and the source electrode S of a second TFT 624 are connected to the gate bus line 610 associated therewith through contact holes 630 and 632, respectively. The source electrodes S and the drain electrodes D of the first and third TFTs 622 and 626 serve as conductors and form capacities in combination with the gate electrode G of the second TFT 624. The drain electrode D of the second TFT 624 and the drain electrode D of the third TFT 626 are connected to the anti-ESD common electrode section 670 through the anti-ESD bus line 660.

In the present embodiment, the first and third TFTs 622 and 626 are formed with channel lengths smaller than the channel length of the second TFT 624. As a result, when static electricity in the form of a very steep pulse voltage is generated on the gate bus line 610, the first TFT 622 or the third TFT 626 is broken before the second TFT 624 is broken to protect the second TFT 624. Therefore, even when either of the first and third TFTs 622 and 626 is broken, since no direct shorting occurs between the gate bus line 610 and the anti-ESD common electrode section 670, no problem occurs at subsequent steps including a TFT test.

The channel widths of the first and third TFTs 622 and 626 are equal to each other and are similar to the channel width of the second TFT 624. Therefore, the conductivity of the second TFT 624 is substantially the same as the conductivity of the first and third TFTs 622 and 626 which are regarded operating in series. Thus, a current associated for protection against ESD can be shared between the second TFT 624 and the combination of the first and third TFTs 622 and 626.

The anti-ESD common electrode section 670 is formed above the gate bus lines 610 with an insulation film (not shown) interposed between them. As shown in FIG. 8, the anti-ESD common electrode section 670 has openings 672 which are formed along bent parts 611 of the gate bus lines 610 in regions thereof overlapping the gate bus lines 610.

One opening 672 is formed for each gate bus line 610, and overlapping portions 674 are formed on two edges of an opening 672.

On the array substrate 600 having the above-described configuration, when static electricity E1 flows in from the outside of a gate bus line 610, inter-layer shorting occurs between the anti-ESD common electrode section 670 and the gate bus line 610 in a shorting part S.

The inter-layer shorting can be repaired by cutting the anti-ESD common electrode section 670 in cutting positions C1 and C2 on both sides of the shorting part S using laser beams. Even though one of the overlapping portions 674 is thus cut off, a path of conduction can be maintained by the other overlapping portion 674. Therefore, the anti-ESD common electrode section 670 can be easily repaired. At this time, no repair is required for the gate bus line 610.

As thus described, a repair can be facilitated by employing a configuration in which openings 672 are formed not only in a common wiring section as described in each of the above embodiments but also in regions of an anti-ESD common electrode section 670 that overlap gate bus lines 610, the electrode section 670 combining anti-ESD bus lines 660 connected to anti-ESD sections (anti-ESD circuits or anti-ESD elements) 620 for preventing ESD on the gate bus lines 610.

While the present embodiment employs a configuration in which the anti-ESD sections 620 are formed on the gate bus lines 610, a configuration may be employed in which the anti-ESD sections 620 are disposed on drain bus lines (not shown). It is obviously possible to employ a configuration in which the anti-ESD sections 620 are disposed on each of the gate bus lines 610 and drain bus lines. Openings may be provided on the anti-ESD common electrode section 670 when the anti-ESD common electrode section 670 is configured as a common line for the drain bus lines.

While the above-described structure of an anti-ESD circuit is used in a liquid crystal display having channel-etching type TFTs formed in pixel regions thereof, this is not limiting the invention, and anti-ESD circuits according to the present embodiment may be used in a liquid crystal display having etching-stopper type TFTs. In addition, first and second resistors may be formed instead of the first TFT 622 and the third TFT 626.

The anti-ESD sections 620 are not limited to the anti-ESD circuits disclosed in the present embodiment, and they may be constituted by anti-ESD elements. In this case, a common wiring section is provided, in which bus lines are electrically connected to each other through high resistance elements to disperse a current flowing through one bus line. Since the common wiring overlaps the gate or drain bus lines, an electrode can be repaired by cutting a part of either of overlapping portions thereof in the same way as in the first and second embodiments.

A set of anti-ESD sections 620 may be formed on each bus line, and elements formed at the anti-ESD sections 620 may be used on a shared basis as much as possible to reduce the total number of the elements. Such an arrangement makes it possible to reduce the failure rate of the constituent elements, the area occupied by the elements and the number of the constituent elements.

Eighth Embodiment

Figure 9:
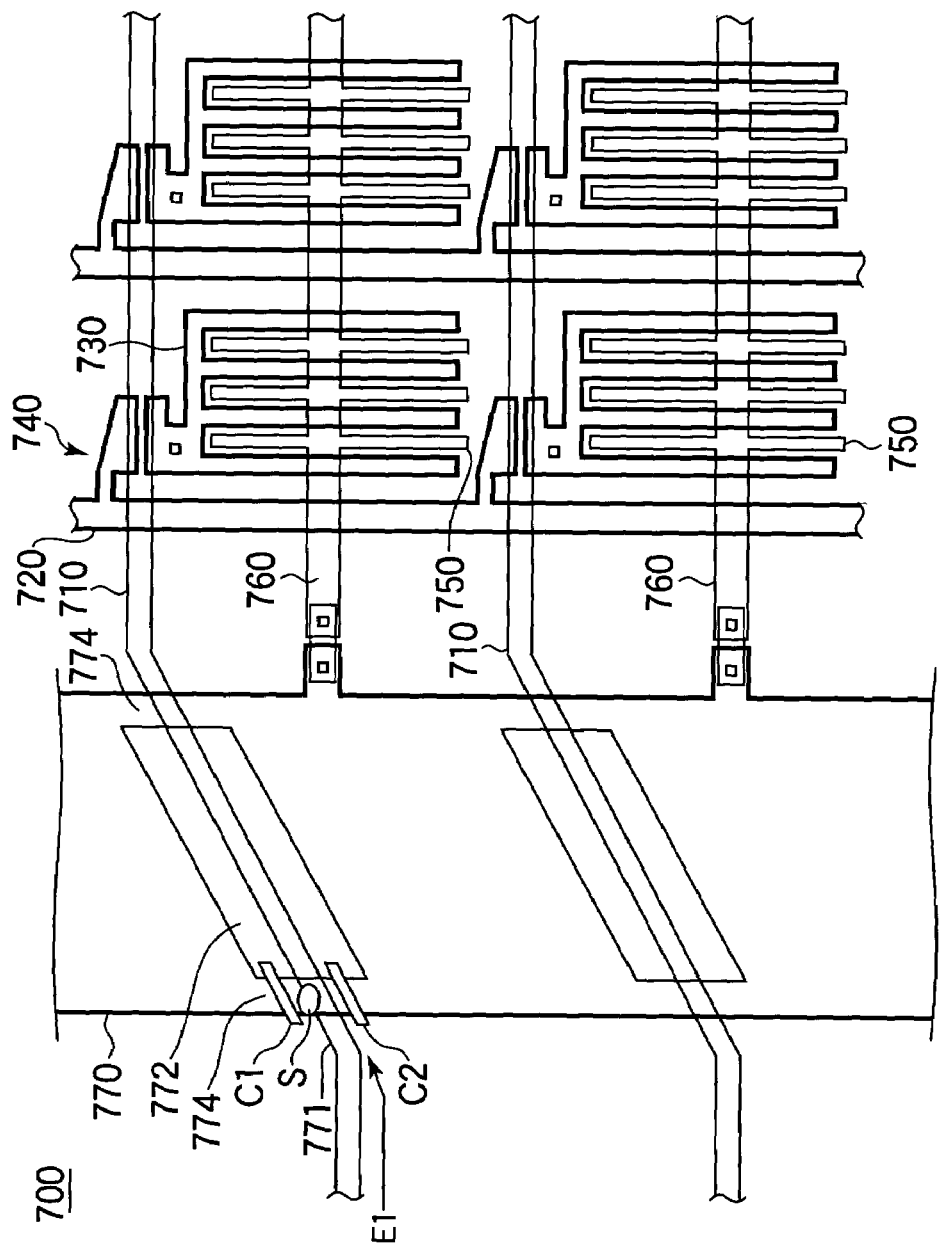
FIG. 9 shows an example of a configuration of a partial surface of a substrate for a display according to an eighth embodiment of the invention.
Figure 10:
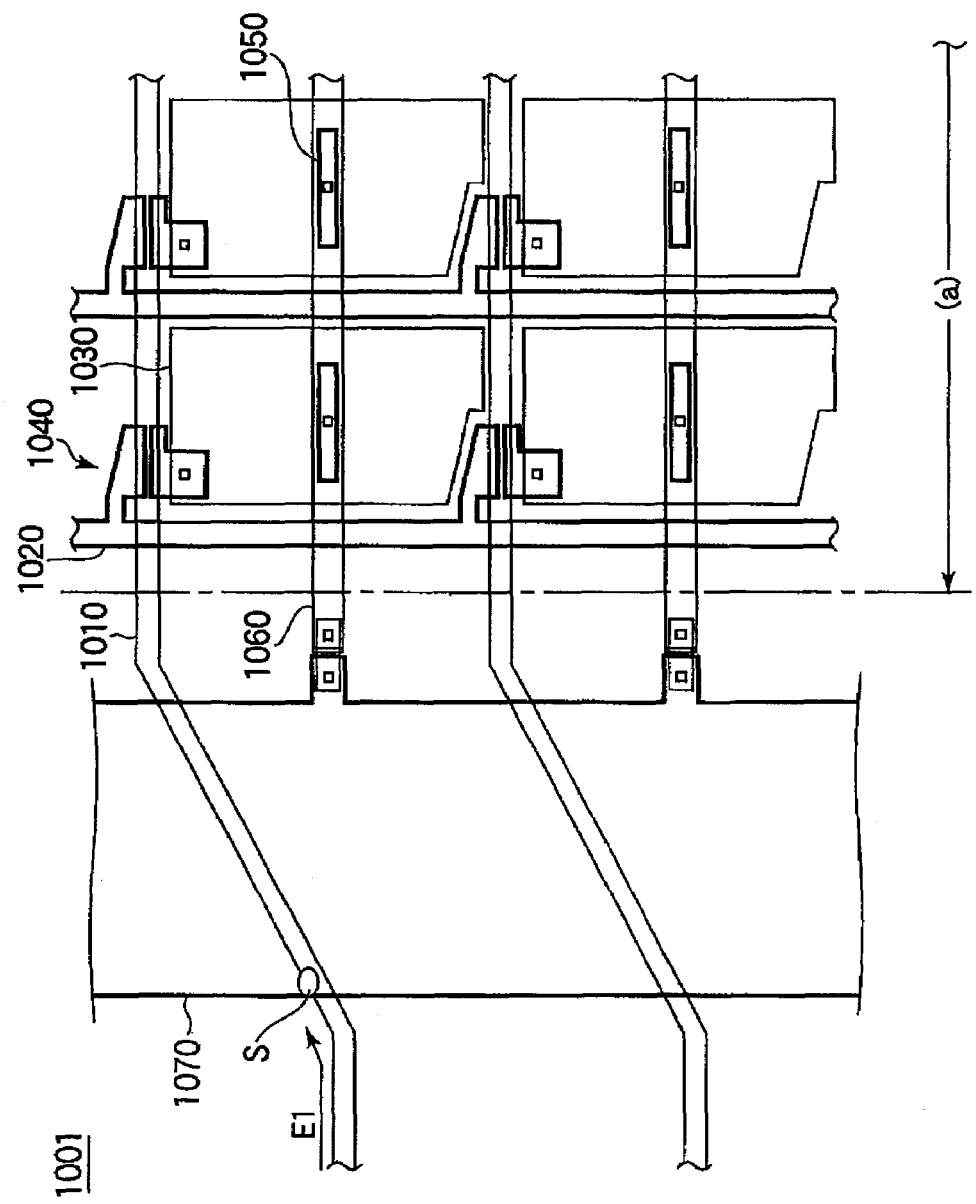
FIG. 10 shows an example of a configuration of a partial surface of a substrate for a display according to the related art.

An eighth embodiment of the invention will now be described with reference to FIG. 9. FIG. 9 shows an example of a configuration of a part of a surface of a substrate for a display according to the present embodiment of the invention. In the following, features which have substantially identical counterparts in the first embodiment will not be described, and the description will address areas in which changes are made only.

The above-described first through sixth embodiments are configured to facilitate a repair on inter-layer shorting between a gate bus line 10 and a storage capacitor common electrode section 70. The present embodiment provides a configuration to be used for an electrode section of an IPS (In-Plane Switching) type (horizontal electric field type) liquid crystal display, in which opposite electrodes for forming horizontal electric fields (that are different from opposite electrodes for forming vertical electric fields on an opposite substrate of a TN or VA type display) formed on an array substrate 700 (other than pixel electrodes, and source electrodes, gate electrodes and drain electrodes of TFTs, and storage capacitor electrodes) are combined.

The horizontal electronic field type liquid crystal display comprises an array substrate 700 (a substrate for a display) formed with TFTs, pixel electrodes and opposite electrodes for forming horizontal electric fields and the like for each pixel region, an opposite substrate (not shown) provided opposite to the array substrate 700 and a liquid crystal layer (not shown) sealed between the array substrate 700 and the opposite substrate. A display area is formed by the pixel electrodes 730 and opposite electrodes 750 for forming horizontal electric fields which are arranged in a comb-type configuration opposite to each other.

FIG. 9 shows a surface of an array substrate of a horizontal electric field type liquid crystal display as viewed from the side of the liquid crystal layer thereof. In FIG. 9, the region of external connection terminals of gate bus lines is partially omitted to show a neighborhood of a display area only.

Specifically, an array substrate 700 is used in a horizontal electric field type liquid crystal display and, as shown in FIG. 9, it has a plurality of gate bus lines 710 (first bus lines) and a plurality of drain bus lines 720 (second bus lines) which are orthogonal to each other and a source electrode of a TFT 740 and a pixel electrode 730 provided at each of intersections between the plurality of gate bus lines 710 and the plurality of drain bus lines 720.

Further, the array substrate 700 comprises an opposite electrode 750 for forming horizontal electric fields which is provided in association with each of the pixel electrodes 730 for forming a horizontal electric field between the pixel electrode 730 and itself, a plurality of opposite electrode bus lines (third bus lines) 760 connected to respective opposite electrode 750 for forming horizontal electric fields and formed between respective gate bus lines 710, and a common electrode section 770 for opposite electrodes serving as a combining section at which the plurality of opposite electrode bus lines 760 are combined.

The gate bus lines 710 correspond to the "first wiring section" according to the invention, and the common electrode section 770 for opposite electrodes corresponds to the "second wiring section" according to the invention. However, this is not limiting the invention, and the "first wiring section" according to the invention may include the gate bus lines 710 and the drain bus lines 720, and the "second wiring section" according to the invention may include the storage capacitor bus lines, the storage capacitor common electrode section, the anti-ESD bus lines and the anti-ESD common wiring section in the above-described embodiments.

As shown in FIG. 9, the drain bus lines 720 are formed such that they extend in the vertical direction in the figure, and gradation signals are supplied to them. The gate bus lines 710 are formed such that they extend in the horizontal direction in the figure orthogonally to the drain bus lines 720, and scan signals are supplied to them. Pixel regions are defined by the drain bus lines 720 and the gate bus lines 710.

An external connection terminal (not shown) is provided at one end of each drain bus line 720 for electrical connection with an external element. Similarly, an external connection terminal is provided at one end of each gate bus line 710 for electrical connection with an external element.

The TFTs 740 are formed, for example, in a channel-etched type configuration in the vicinity of intersections between the drain bus lines 720 and the gate bus lines 710. A drain electrode of a TFT 740 is extended from the drain bus line 720 associated therewith and formed such that the end of the same is located at one edge of an active semiconductor layer (not shown) above the gate bus line 710 associated therewith. A source electrode of the TFT 740 is formed at another edge of the active semiconductor layer such that it faces the drain electrode. In such a configuration, a region of the gate bus line 710 located directly under the active semiconductor layer serves as a gate electrode of the TFT 740.

Although not shown, a gate insulation film is formed on a gate bus line 710, and an active semiconductor layer constituting a channel is formed on the gate insulation film. The active semiconductor layer is formed above the gate bus line 710 so as to extend along the gate bus line 710 and is electrically isolated from the active semiconductor layer of the TFT in another pixel region adjacent to the same. The TFT structure shown in FIG. 9 has a configuration in which a straightly formed part of a gate bus line 710 is used as a gate electrode instead of forming the gate electrode as an extension of the gate bus line 710.

A pixel electrode 730 is formed with a first convexo-concave section which is directly extended from the source electrode of the associated TFT 740 into the pixel region and which is substantially in the form of comb-teeth extending downward in the figure.

A horizontal electric field forming opposite electrode 750 is formed with a second convexo-concave section which is formed in the associated pixel region on the array substrate 700 and which is substantially in the form of comb-teeth extending upward and downward in the figure so as to match the first convexo-concave section of the pixel electrode 730.

Since electric fields are applied to a liquid crystal layer in the horizontal direction according to the IPS method, the horizontal field forming opposite electrodes 750 are provided on the array substrate 700 along with the pixel electrodes 730, and the gate electrodes, the drain electrodes and the source electrodes of the TFTs 740. Horizontal electric fields are formed by the pixel electrodes 730 and the horizontal electric field forming opposite electrodes 750.

The horizontal electric field forming opposite electrodes 750 are opposite electrodes according to the IPS method and are different from the opposite electrodes (vertical field forming opposite electrodes) on the opposite substrate according to the vertical electric field method (TN method or VA method) in the first through seventh embodiments.

In the pixel configuration that is commonly used in the IPS method shown in FIG. 9, the horizontal field forming opposite electrodes 750 are formed in parallel with the pixel electrodes 730 at an appropriate interval from the same.

The opposite electrode bus lines 760 are connected to the respective horizontal electric field forming opposite electrodes 750 and are provided in parallel with the gate bus lines 710. The opposite electrode bus lines 760 extend to an external electrode section constituting the common electrode section 770 which is the opposite electrodes combined outside the display area and to which a predetermined potential is applied. Therefore, the common electrode section 770 for the opposite electrodes thus combined intersects extensions of the gate bus lines 710.

The common electrode section 770 for the opposite electrodes is formed above the gate bus lines 710 with an insulation film (not shown) interposed between them and is formed with openings 772 in regions thereof overlapping the gate bus lines 710. The openings 772 extend along bent parts 711 of the gate bus lines 710. Therefore, overlapping portions 774 overlapping the gate bus lines 710 are formed.

On the array substrate 700 having the above-described configuration, when static electricity E1 flows in from the side of a gate TAB terminal for a gate bus lines 710, inter-layer shorting occurs between the common electrode section 770 for the opposite electrodes and the gate bus line 710 in a shorting part S. The reason is that one of the two overlapping portions 774 overlaps the gate bus line 710.

The inter-layer shorting can be repaired by cutting the common electrode section 770 for the opposite electrodes in cutting positions C1 and C2 on both sides of the shorting part S using laser beams. Even though one of the overlapping portions 774 is thus cut off, a path of conduction can be maintained by the other overlapping portion 774. Therefore, the common electrode section 770 for the opposite electrodes can be easily repaired. At this time, no repair utilizing laser beam cutting is required for the gate bus line 710.

As thus described, the configuration of the openings can be used not only in a common electrode as described in each of the above embodiments but also on an array substrate according to the IPS mode. The configuration may be used also in a common wiring section for opposite electrodes at which bus lines connected to opposite electrodes for forming horizontal electric fields are combined. A repair can therefore be easily carried out on a substrate for an IPS display with the same effects as those in the first embodiment provided.

MODIFICATIONS

While substrates for a display and liquid crystal displays utilizing the same according to the invention have been described with reference to several specific embodiments thereof, each of the embodiments may be modified in various ways.

For example, the above description of embodiments have addressed relationships between a gate bus line and a storage capacitor common electrode section, between a gate bus line and a common electrode section for opposite electrodes and between a gate bus line and a common electrode section for protection against ESD. The same techniques may obviously be used between a drain bus line and a storage capacitor common electrode section, between a drain bus line and a common electrode section for opposite electrodes and between a drain bus line and a common electrode section for protection against ESD.

Further, although the second embodiment employs a configuration in which two openings are provided for each gate bus line, three or more openings may be provided. In this case, static electricity from a gate bus line may enter from the side of external connection terminals to sequentially cause inter-layer shorting at a first overlapping portion between a first opening and an edge and at a second overlapping portion between a second opening and the first opening. In such a case, conduction can be maintained by a third overlapping portion between the second and third openings and a fourth overlapping portion between the third opening and another edge even if the first and second overlapping portions are cut using laser beams, and it is therefore possible to repair the liquid crystal display panel as a whole more easily.

Further, while the first through sixth embodiments employ configurations in which storage capacitor common electrode sections are disposed on two ends of an array substrate, a configuration may be employed, in which the storage capacitor common electrode section is disposed on one end only.

Obviously, the ESD feature in the seventh embodiment and the common electrode section for combining lines having an IPS-based configuration in the eighth embodiment may be adopted in the configuration of the common electrode section described in any of the first through sixth embodiments (e.g., the shape of the openings and the bypass wirings).

An array substrate may have a configuration in which an anti-ESD common electrode section having openings according to the seventh embodiment is provided in addition to a storage capacitor common electrode section according to any of the first through sixth embodiment. Further, an array substrate may have a configuration in which an anti-ESD common electrode section having openings according to the seventh embodiment is added to a storage capacitor common electrode section formed with no opening. An array substrate may have a configuration in which a common electrode section for opposite electrodes having openings according to the eighth embodiment is provided in addition to a storage capacitor common electrode section according to any of the first through sixth embodiments. An array substrate may have a configuration in which a common electrode section for opposite electrodes having openings according to the eighth embodiment is added to a storage capacitor common electrode section formed with no opening.

Furthermore, an array substrate may have a configuration in which both of an anti-ESD common electrode section having openings according to the seventh embodiment and a common electrode section for opposite electrodes having openings according to the eighth embodiment are provided in addition to a storage capacitor common electrode section according to any of the first through sixth embodiments. In this case, the configuration of the common electrode section in any of the first through sixth embodiments may be adopted for the anti-ESD common electrode section and the common electrode section for opposite electrodes. A configuration may alternatively be employed in which no opening is provided on any of the storage capacitor common electrode section, the anti-ESD common electrode section and the common electrode section for opposite electrodes.

Furthermore, a configuration may be employed, in which one common wiring section extending across gate bus lines has the configuration in any of the first through sixth embodiment and in which another common wiring section extending across drain bus lines has the configuration in any of the first through sixth embodiments. Such a configuration may include the feature for protection against ESD in the seventh embodiment and the common electrode for combining lines having an IPS-based configuration in the eighth embodiment. In addition, openings or bypass wirings having an ESD configuration or an IPS-based configuration may be formed.

Although TAB terminals are provided as external connection terminals in the above-described embodiments, COG (Chip On Glass) type configuration may alternatively be employed. In this case, an IC chip connected to the external connection terminals is preferably formed in advance at the same process at which the array substrate is manufactured.

Further, it is preferable that a plurality of TCPs (Tape Carrier Packages) carrying driver ICs for driving gate bus lines are mounted on the left side of an exposed picture-frame area of an array substrate. It is also preferable that a plurality of TCPs carrying driver ICs for driving drain bus lines are mounted on the upper exposed area of the array substrate 1 in the figure. The plurality of TCPs are connected to a peripheral circuit substrate (not shown).

At the four corners of an array substrate, there is preferably provided transfer formation regions which are electrically connected to opposite electrodes for forming vertical electric fields formed on an opposite substrate through a transfer portion when the array substrate is combined with the opposite substrate. In this case, each of the transfer formation regions is preferably formed with a connection pad constituted by a lower electrode formed of, for example, the same material as that of storage capacitor bus lines and an upper electrode formed of the same material as that of pixel electrodes. It is desirable that the connection pads are electrically connected to the storage capacitor common wiring section and that the transfer formation regions are provided in the vicinity of at least a pair of diagonal corners of the array substrate or in the vicinity of at least both ends of one side of the array substrate in the direction in which the gate bus lines extend. Alternatively, a greater number of transfer formation regions may be substantially uniformly provided, for example, around the display area.

In addition, the invention is not limited to the above-described embodiments and may be modified in various ways. For example, active matrix type liquid crystal displays utilizing TFTs as switching elements have been described by way of example in the above embodiments. However, the invention is not limited to them and may be applied to substrates for various types of displays including active matrix type liquid crystal displays utilizing non-linear elements such as diode elements (MIM), passive type liquid crystal displays, EL (Electro-Luminescence) displays, PDPs (Plasma Displays) and the like.

Substrates for a display as described above may be used in various types of liquid crystal displays. In this case, the liquid crystal displays comprise driver circuits, the driver circuits driving the liquid crystal displays and including a power supply circuit, a display information processing circuit and an inspection circuit used for inspections after manufacture, in addition to a gate line driving circuit and a drain line driving circuit. The display information processing circuit processes and outputs display information, and it may include, for example, an amplification/polarity inversion circuit, a phase developing circuit, a rotation circuit, a gamma control circuit and a clamp circuit.

Further, the above-described embodiments include various stages of implementation, and various modifications can be made by appropriately combining a plurality of the constituent features disclosed. That is, the invention obviously includes any embodiment that is a combination of the above-described embodiments or a combination of any of the embodiments and any of the modifications thereof. It is obvious that such an embodiment can also provide the same effects as those which are readily understood from the features disclosed in the embodiments and the modifications, although not described in the embodiments. A configuration may be employed in which some of the constituent features of the embodiments are deleted.

The above description has only disclosed some exemplary embodiments of the invention which may be appropriately altered or modified within a predetermined range. The embodiments merely shows examples and do not place any limitation on the invention.

What is claimed is:

1. A method for repairing a short in a substrate for a display which comprises a first wiring section formed so as to outwardly extend from an inside of a display area on the substrate, a second wiring section formed so as to intersect the first wiring section in an overlapping region outside the display area, with an insulation film interposed between the first and second wiring sections, said method comprising:
- forming an opening in the second wiring section at least in a part of the overlapping region;
- defining a first overlapping portion between a first end of the opening and a first edge of the second wiring section, where the first wiring section and the second wiring section overlap;
- defining a second overlapping portion between a second end of the opening and a second edge of the second wiring section, where the first wiring section and the second wiring section overlap; and
- cutting the second wiring section on both sides of the first wiring section next to the first overlapping portion to electrically isolate a short occurring between the first and second wiring sections in the first overlapping portion, and cutting the second wiring section on both sides of the first section wiring section next to the second overlapping portion to electrically isolate a short occurring between the first and second wiring sections in the second overlapping portion.

2. The method according to claim 1, wherein the opening is formed along the extending direction of the first wiring section.

3. The method according to claim 2, wherein a plurality of the openings is formed.

4. The method according to claim 1, wherein the opening is formed in the direction in which the second wiring section extends.

5. The method according to claim 4, wherein a plurality of the openings is formed.

6. The method according to claim 1, further comprising a third wiring section formed across the opening and stacked on the second wiring section with a second insulation film interposed therebetween.

7. The method according to claim 6, wherein the third wiring section has a connection part electrically connected to the second wiring section.

8. The method according to claim 6, wherein a plurality of the third wiring sections are formed.

9. The method according to claim 1, wherein the second wiring section comprises a storage capacitor common electrode section commonly connected to each of a plurality of storage capacitor elements formed in the display area.

10. The method according to claim 1, further comprising a plurality of anti-ESD sections disposed on the substrate and connected to respective bus lines constituting the first wiring section, wherein the second wiring section comprises one anti-ESD common wiring section which is commonly connected to each of the plurality of anti-ESD sections.

11. The method according to claim 1, further comprising a horizontal electric field forming opposite electrode disposed for forming a horizontal electric field between a pixel electrode in the display area and itself and formed in association with the pixel electrode, wherein the second wiring section comprises one common electrode section for opposite electrodes which is commonly connected to each of a plurality of the horizontal electric field forming opposite electrodes.

12. A display comprising a substrate having a plurality of bus lines, wherein a short occurring in a substrate for a display has been repaired according to a method for repairing a short in a substrate for a display which comprises a first wiring section formed so as to outwardly extend from an inside of a display area on the substrate, a second wiring section formed so as to intersect the first wiring section in an overlapping region outside the display area, with an insulation film interposed between the first and second wiring sections, said method comprising: forming an opening in the second wiring section at least in a part of the overlapping region; defining a first overlapping portion between a first end of the opening and a first edge of the second wiring section, where the first wiring section and the second wiring section overlap; defining a second overlapping portion between a second end of the opening and a second edge of the second wiring section, where the first wiring section and the second wiring section overlap; and cutting the second wiring section on both sides of the first wiring section next to the first overlapping portion to electrically isolate a short occurring between the first and second wiring sections in the first overlapping portion, and cutting the second wiring section on both sides of the first section wiring section next to the second overlapping portion to electrically isolate a short occurring between the first and second wiring sections in the second overlapping portion.

* * * * *